United States Patent
Horan, Jr.

[11] 3,739,810
[45] June 19, 1973

[54] PRESSURE CONTROLLED WATER SYSTEM WITH ISOLATABLE PRESSURE SWITCH

[75] Inventor: Raymond E. Horan, Jr., Little Rock, Ark.

[73] Assignee: Jacuzzi Bros., Incorporated, Little Rock, Ark.

[22] Filed: Dec. 9, 1971

[21] Appl. No.: 206,310

[52] U.S. Cl. .................................. 137/568, 417/38
[51] Int. Cl. ...................... E03b 11/16, F04b 11/00
[58] Field of Search ...................... 137/568; 417/30, 417/38, 39, 311

[56] References Cited
UNITED STATES PATENTS

| | | |
|---|---|---|
| 3,141,475 | 7/1964 | Guinard et al. ...................... 137/568 |
| 3,150,684 | 9/1964 | Guinard et al. ...................... 137/568 |
| 3,394,733 | 7/1968 | Vacuzzi ............................. 137/568 |
| 3,572,381 | 3/1971 | Nash ................................. 137/568 |

*Primary Examiner*—William R. Cline
*Attorney*—Edward Brosler

[57] ABSTRACT

A water system with a pressure controlling valve, includes a pressure switch responsive to full closing of said valve to disconnect the pump in the system, and having its cut-in responsive pressure set sufficiently close to the cutout pressure, to assure delivery to service at pressure which is indistinguishably constant.

4 Claims, 6 Drawing Figures

Patented June 19, 1973

INVENTOR.
RAYMOND E. HORAN, JR.

BY Edward Brosler

ATTORNEY

INVENTOR.
RAYMOND E. HORAN, JR.
BY Edward Brosler
ATTORNEY

PRESSURE CONTROLLED WATER SYSTEM WITH ISOLATABLE PRESSURE SWITCH

The present invention relates to Water Systems and more particularly to pressure control in such systems, and is particularly related to the automatic water system forming the subject matter of patent application Ser. No. 28,637, filed Apr. 25, 1970 for TANKLESS AUTOMATIC WATER SYSTEM.

The system of the aforementioned Nash application is self starting in response to opening of a service line, and the pump continues pumping and meeting the demands of service, so long as service demands are in effect. Upon closing of the service line, the resulting increase in pressure is then coupled into a pressure switch which disconnects the pump motor to shut down the system.

In such system, the pump pressure varies with load, in accordance with the pressure head curve of the pump used, and it might at times exceed a pressure at lower flow rates, which might adversely affect components in such systems, which are not designed to withstand such pressures.

Among the objects of the present invention are:
1. To provide a novel and improved water system.
2. To provide a novel and improved water system of the tankless type in which service pressure can never reach the full pressure capacity of the pump supplying the water in such system, throughout the high pressure portion of the pump head curve.
3. To provide a novel and improved water system wherein the service pressure remains substantially the same throughout the useful portion of the pump discharge capacity and particularly throughout the lower flow rates of the system, so long as the service demand does not exceed the capacity of the pump.
4. To provide a novel and improved water system wherein the service pressure remains substantially the same regardless of the service demand, within the capacity of the pump to supply such service.

Additional objects of the invention will be brought out in the following description of a preferred embodiment of the same, taken in conjunction with the accompanying drawings wherein, FIG. 1 is a view depicting a water system embodying the present invention;

Figure 2:
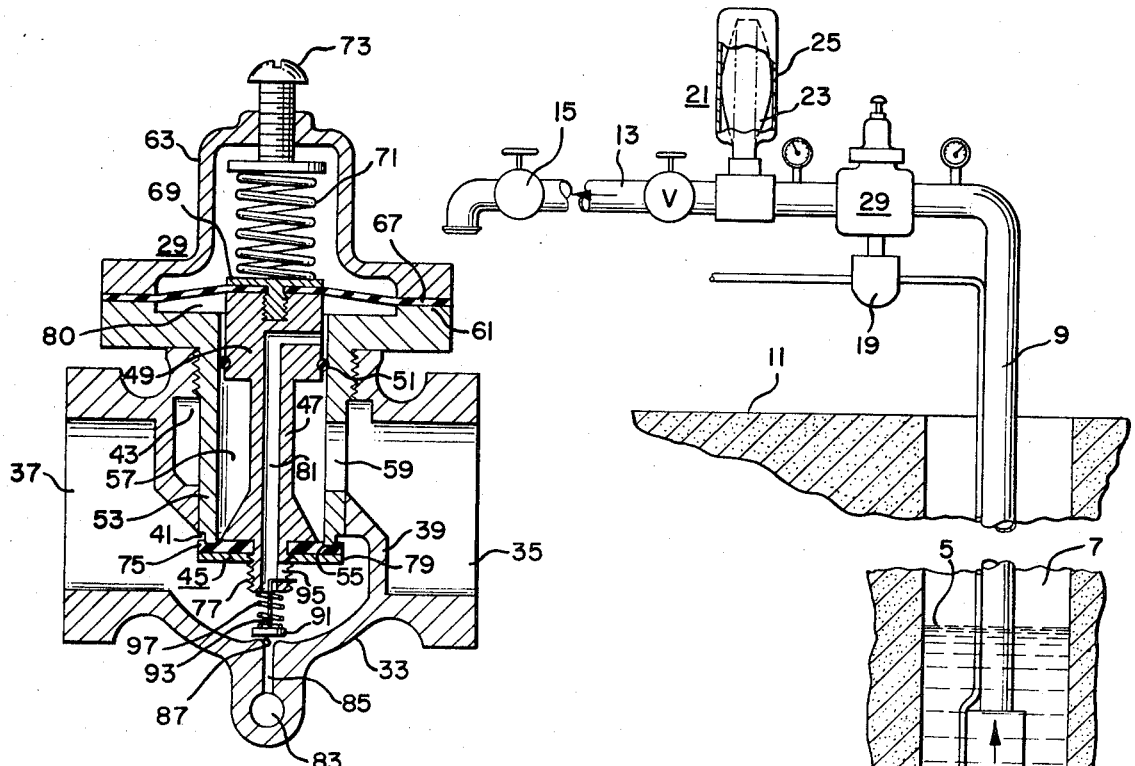
FIG. 2 is a view in section through a valve assembly constituting an important component in the system combination of FIG. 1.
Figure 1:
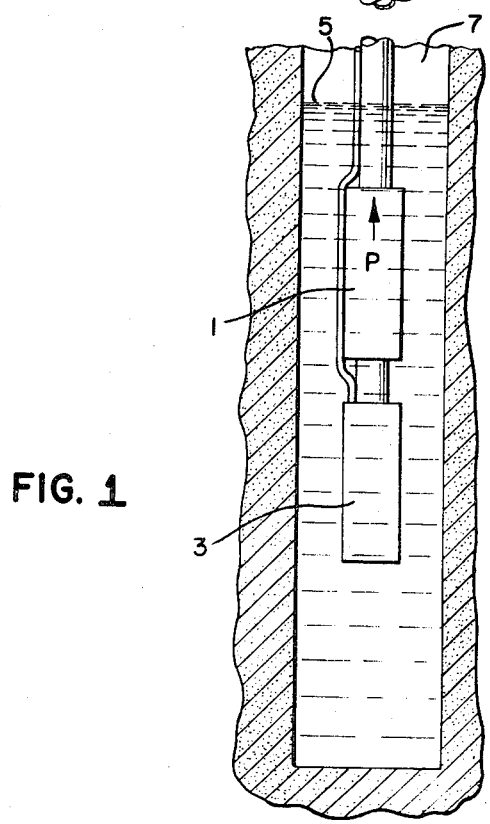

Referring to the drawings for details of the invention in its preferred form, the system as illustrated involves a pump 1 of the submersible type driven by a motor 3 coupled thereto, the pump and motor being submerged below water level 5 in a well 7 and discharging through a discharge line 9 to a point above ground level 11. The water thus discharged, enters a service line 13, from which others may branch off, each terminating in a closed srvice valve 15, which may be a spigot or equivalent.

A switch means assembly including a pressure switch 19 connected in circuit with the pump motor, and a variable pressure device 21 installed in the service line, is responsive to the opening of the service line, to cause the pump to start and immediately deliver water to service at substantially a constant pressure, depending on the rate of flow of water to service.

The pressure switch may be any one of a conventional type normally employed in water pressure systems to control the pumping cycles of the pump, and the variable pressure device involves an expansible tube 23 of any elastic material disposed in a protective housing 25, this expansible tube being flow connected to the service line, and pressure connected via the water in the system, to the pressure switch by way of a valve assembly 29, such as depicted in detail in FIG. 2, which is installed intermediate the pump dishcarge line and the service line.

The capacity of the variable pressure device 21 is sufficiently small as to respond to the opening of a service line and quickly drop the pressure therein to the lower pressure setting of the pressure switch at each opening of the service line. Thus the pump will function in response to the opening of a service line for essentially each and every demand from service.

As thus far described, except for the valve assembly of FIG. 2, the system incorporates features of the system illustrated and described in the application Ser. No. 28,637, filed Apr. 15, 1970, for Tankless Automatic Water System, the valve assembly of FIG. 2 introducing into the system certain marked features and advantages not realizable in the prior system.

The valve assembly involves a valve body 33 having open ends 35, 37, the pump discharge line being connected at one end 35 and the service line to the other end 37, the valve body including an enlarged midsection traversed by a partition 39 including a horizontal section which is provided with a main valve opening 41.

In line with this valve opening, is an opening 43 above in the upper wall of the housing.

A valve 45 adapted to close this partition opening from below, is provided with a valve stem 47 extending upwardly through the upper opening. This valve stem terminates in an enlargement 49 at its upper end, which is slidably sealed with respect to adjacent surrounding wall by an O-ring 51.

While the partition itself may serve as the valve seat for such valve, and the wall of the upper opening as the wall with respect to which the stem enlargement is slidably sealed, I prefer to install a cylindrical insert 53 slidably fitting at its lower end into the valve opening in the partition and threadedly secured in the wall of the upper opening, the lower end of this insert providing a seat 55 for the main valve, while the interior cylindrical wall surface of the insert permitting a sliding fit of the stem extension as sealed by the O-ring.

In the closed position of the valve, the valve stem defines with the sleeve, a chamber 57, access to which from the pump discharge line, is provided through an opening 59 in the sleeve.

At its upper end, the sleeve terminates in a diaphragm support rim 61 of increased diameter, between which and a spring housing 63 is clamped a diaphragm 67 of expandable material, which in turn is affixed at its center to the enlarged end of the valve stem, by a flat head screw 69.

An established pressure is maintained on the diaphragm and valve stem by a compression spring 71 installed within the spring housing, between the diaphragm screw and an adjusting screw 73 extending through the upper end of the spring housing, to enable adjustment of the spring pressure against the valve stem and thereby determine maximum service pressure.

The main valve structurally involves a valving disc 75 of resilient compressible material of low durometer, surrounding a depending threaded extension 77 of the valve stem, and retained in its installed position by a backing disc 79 threaded onto this valve stem extension.

The diaphragm defines the upper wall of a chamber 80 which is placed in communication with the service line connection to the valve assembly, by means of a passageway 81 extending axially upwardly through the valve stem to the enlarged end thereof, where its direction is changed to cause it to emerge at a point above the O-ring seal.

In the lower wall of the valve assembly housing, is an opening 83 connecting interiorly of the service line side of the housing by a small passageway 85 terminating within the housing in a valve seat 87 directly below and in line with the valve stem passageway. To the housing at this opening 83 is coupled the pressure switch, which thus places the pressure switch in pressure communication with the pressure conditions existing in the service line.

With the pressure switch so coupled, provision is made for rendering the pressure switch ineffective while the pump is functioning and supplying service, by blocking the passageway 85, such provision taking the form of a pressure switch trip valve 91 having a valve stem 93 extending up into the lower end of the axial passageway and then bent at right angles to enter a side opening 95 provided in the lower extension of the valve stem. A compression spring 97 between the valve and the lower end of the main valve stem extension, serves to urge the pressure switch valve toward its seating position, and cause it to function as a spring loaded check valve should the pressure at the pressure switch exceed the pressure in the service line.

Such seating is permitted when the main valve is driven down to its open position, the length of the valve stem of the pressure switch trip valve being such that when the main valve establishes initial closing contact, the trip valve is still seated, but the over-ride permitted by the compressability of the valving disc, is sufficient to permit the main valve stem to lift the trip valve off its valve seat and put the pressure switch in pressure communication with the service line.

The condition of the pressure switch trip valve as illustrated in FIG. 2, represents the condition existing with all service line valves closed, thus representing no demand from service, and the expansible tube of the variable pressure device is expanded to the point of maintaining a pressure in the system above the cut off pressure setting of the pressure switch. The pressure switch is thus exposed to the pressure in the variable pressure device and the pump motor is disconnected from its source of power. The prevailing pressure in the service line due to the variable pressure device, will likewise be transmitted to the main valve and the diaphragm chamber, thereby serving to maintain the main valve in its fully closed condition and to assure that the trip valve will remain open.

With all conditions existing as thus described, the opening of a service line valve will permit the variable pressure device to collapse and immediately drop the pressure on the service line side of the valve assembly, whereby the pressure at the pressure switch will drop to its lower pressure setting to connect the pump motor and start the pump.

The main valve, due to this drop in pressure, will, in the meantime have opened.

Such opening of the main valve produces two effects, namely:

1. It places the pump in flow communication with the service line, and
2. It simultaneously closes the pressure switch valve and renders and pressure switch ineffective while the pump is supplying service.

Upon demand for service, the pump pressure will develop to a value such that the service line pressure approaches a desired value, as determined by the pressure setting of the spring 71, and without neccessarily lifting the pressure switch trip valve 91, since this valve is lifted only in response to the override of the main valve as permitted by the compressibility of the sealing disc 75 of such main valve. Any tendancy of the line pressure to fluctuate for any reason, will be smoothed out by the action of the variable pressure device, which will serve to maintain a substantially constant pressure in the service line throughout the range in which the pump has the ability to supply the demands of service at such pressure. This is represented by the curve 96 of FIG. 6.

Following a closing of the main valve in response to an increase in the service line pressure sufficient to trip the pressure switch valve, any subsequent demands of service will bring about a rapid reduction in pressure in the diaphragm chamber, thereby permitting the main valve to unseat and allow delivery from the pump. Should the pump continue to deliver water at excessively high pressure, the main valve will hover about its closing position to preclude service pressure rising above the predetermined safe value, as determined by the pressure setting of the spring 71, despite the head capacity curve characteristic of the pump which might otherwise deliver water to service at pressures exceeding values which the components of the system can safely tolerate.

Figure 6:
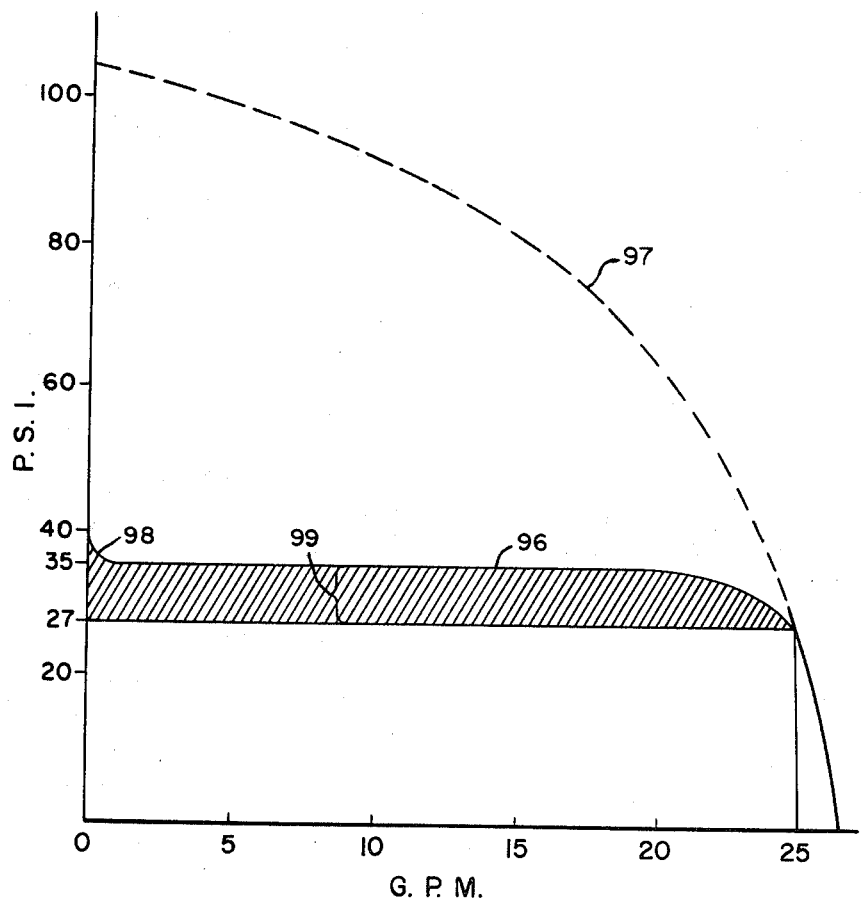
FIG. 6 is a graph depicting the manner in which the system fucntions to alter the head capacity curve of the pump in accomplishing the purpose of the present invention.
Figure 3:
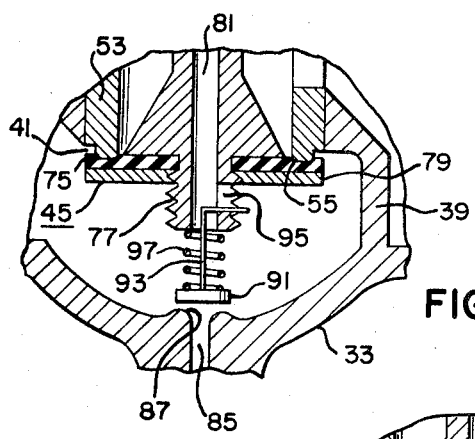
FIG. 3, 4 and 5 are fragmentary enlarged views depicting a feature in the functioning of the valve assembly of FIG. 2.
Figure 4:
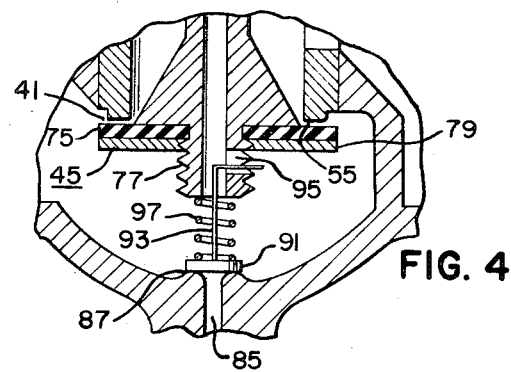
Figure 5:
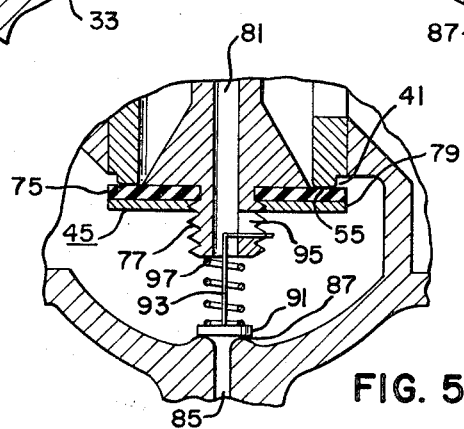

This is particularly pertinent to the service demands of low flow rate, which can be readily appreciated by referring to the curves of FIG. 6 wherein is depicted a conventional head/capacity curve 97 for a pump which, when plotted in terms of pounds per square inch against gallons per minute flow rate, will result in a pressure curve which rises rather steeply from its maximum capacity to the point where its discharge is throttled to zero.

For the particular pump represented by the head/capacity curve of FIG. 6, the pressure developed at shut-off would be in the neighborhood of 104 pounds per square inch. If the desired service pressure is around 35 pounds (curve 96), the pump in question will be able to deliver, in the system as thus far described, at a flow rate up to approximately 25 gallons per minute. The maximum permissible pressure remains substantially the same to a point approaching shut-off of all service, when the pressure rises a pound or so per square inch as indicated by the sudden rise 98 in the pressure curve 96. This is attributable to sealing stress being built up in the compressible seat 75, during which the seat bleeds high pressure water to the service line, thereby causing a build up in pressure which reacts on the diaphragm, sealing off the flow more tightly until zero flow results.

In conventional pressure water systems, pressure switches are set to function at widely separated pressure values, such as a high setting of 50 p s i for opening and a low setting of 20 p s i for closing, and such systems were said to have a pressure range between 50 p s i and 20 p s i. Such systems include storage capacity, and a wide pressure range is essential to preclude excessive cycling of the pump.

In the present system, and contrary to prior conventional practice, it becomes practical to narrow the pressure range setting of the pressure switch to a very narrow range 99, say of the order of 8 p s i, so that, instead of a high pressure setting of 50 p s i to open and a low pressure setting of 20 p s i to close, the high pressure setting may be lowered to say 35 p s i to open and the low pressure setting raised up to 27 p s i.

Thus the service line pressure cannot fluctuate outside this narrow pressure range, which represents essentially an average of the wide pressure variations capable of being experienced in prior art systems, and as viewed from the service end of the system, any slight pressure variations occurring within such 8 p s i pressure range are undetectable by the user. Insofar as he is concerned, the system is delivering at a constant pressure, regardless of the service demand, a result which has been strived for but never previously achieved.

Actually, in setting the pressure switch for its higher value aetting, it is preferably set to approximately 40 p s i in the system under consideration, which is about 5 p s i above the desired higher pressure. In the example discussed above, where the desired higher pressure is 35 p s i, the pressure switch will be set to open at say 40 p s i and close at the 27 p s i value. This is to allow for variances in switch operating points.

With the pressure switch thus set, and the system ready for service, an opening of a service line will immediately, upon drop in pressure to the 25 p s i level, cause the pump to start and promptly build the pressure up to 35 p s i, the pressure setting of the spring 71, the pressure switch in the meantime, having been cut off from pressure communication with the service line and rendered ineffective by the opening of the main valve.

Upon closing off all demand for service, opening of the pressure switch can occur as the discharge to service approaches zero, and being set to open at 40 p s i, the sudden rise as the flow reaches zero assures disconnection of the pump motor.

The 27 to 35 p s i levels referred to above, while representing the preferred range of pressure values, are merely illustrative. The narrow pressure range represented thereby, may be furthr narrowed if desired, and may, if one so wishes, be shifted to a higher or lower level, which in part may be dictated by the capacity of the pump employed in the system.

In order to minimize any adverse effects on the responses of the system to service demands, the main valve and valve stem are so designed that the effective area of the valve exposed to the pump pressure is essentially balanced by the enlarged upper end of the valve stem inclusive of the O-ring seal, thus eliminating any adverse effects which varying high pump input pressures might otherwise have on the operation of the main valve.

From the foregoing description of my invention in its preferred form, it will be apparent that the same is subject to alteration and modification without departing from the underlying principles involved, and I accordingly do not desire to be limited in my protection to the specific details illustrated and described, except as may be necessitated by the appended claims.

I claim:

1. A pressure water system comprising a pump having a discharge line, motor drive means coupled to said pump, a service line terminating in a service valve and a pressure responsive valve between said discharge line and said service line adapted to close upon a rise in service line pressure to a predetermined value, a pressure switch in circuit with said motor drive means, means pressure coupling said pressure switch to said system on the service side of said pressure responsive valve, valve means adapted to block said pressure coupling during open condition of said pressure responsive valve and while supplying water to service, and unblock said pressure coupling during a minimum and no-flow condition of said system, and pressure maintaining means in said system responsive to the opening of said service valve causing initial flow with corresponding pressure reduction, to cause said pressure switch to connect said motor drive means in circuit and drive said pump, flow from which causes said pressure responsive valve to open and block said pressure coupling.

2. A pressure water system in accordance with claim 1, characterized by said pressure switch being set to disconnect said pump motor from circuit at a pressure value of the order of the closing pressure of said pressure responsive valve and set to connect said pump in circuit at a pressure value of the order of 8 p s i below the circuit opening pressure.

3. A pressure water system comprising a pump, a motor connected to drive the pump, a service line for delivering water to a service valve, a pressure regulating valve between the pump and the service line adapted to regulate the maximum pressure in the service line when the service valve is open and the pump is functioning, a pressure switch in electric circuit with said motor and in hydraulic circuit with said service line, said swith being adapted to close the electric circuit and connect said pump motor when exposed to a predetermined low pressure in the service line of a value below said valve regulated pressure, and to open the electric circuit and disconnect said pump motor when exposed to a service line pressure approximately that of said valve regulated pressure, means responsive to the opening of the pressure regulating valve to close the hydraulic circuit to said pressure switch and thus isolate said pressure switch when the regulating valve opens, and to maintain the hydraulic circuit to said pressure switch closed until the pressure regulating valve is substantially completely closed, whereby said pressure switch may function to disconnect said pump motor at approximately the regulated pressure.

4. The system of claim 3 wherein said pressure regulating valve closes through a disc of resilient, compressible material of low durometer and the motion of the valve in compressing the disc during closing is the motion that opens said hydraulic circuit and expose said pressure switch to service line pressure.

* * * * *